(12) United States Patent
Tschache

(10) Patent No.: US 10,423,401 B2
(45) Date of Patent: Sep. 24, 2019

(54) METHOD FOR UPDATING SOFTWARE OF A CONTROL DEVICE OF A VEHICLE

(71) Applicant: VOLKSWAGEN AG, Wolfsburg (DE)

(72) Inventor: Alexander Tschache, Wolfsburg (DE)

(73) Assignee: Volkswagen AG (DE)

( * ) Notice: Subject to any disclaimer, the term of this patent is extended or adjusted under 35 U.S.C. 154(b) by 0 days.

(21) Appl. No.: 15/794,124

(22) Filed: Oct. 26, 2017

(65) Prior Publication Data
US 2018/0113703 A1 Apr. 26, 2018

(30) Foreign Application Priority Data
Oct. 26, 2016 (DE) .................. 10 2016 221 108

(51) Int. Cl.
*G06F 8/65* (2018.01)
*G05B 19/042* (2006.01)
(Continued)

(52) U.S. Cl.
CPC ........... *G06F 8/65* (2013.01); *G05B 19/0426* (2013.01); *G06F 9/44536* (2013.01);
(Continued)

(58) Field of Classification Search
CPC ......... G05B 19/0426; G06F 8/60; G06F 8/61; G06F 8/65; G06F 8/658; G06F 8/66;
(Continued)

(56) References Cited

U.S. PATENT DOCUMENTS 5,694,569 A * 12/1997 Fischer .................. G06F 21/565
707/999.2
6,263,431 B1 * 7/2001 Lovelace .............. G06F 9/4406
713/2
(Continued)

FOREIGN PATENT DOCUMENTS

DE 102004036810 A1 3/2006
DE 602005001497 T2 3/2008
(Continued)

OTHER PUBLICATIONS

B. Choi, S. Lee, J. Na and J. Lee, "Secure firmware validation and update for consumer devices in home networking," in IEEE Transactions on Consumer Electronics, vol. 62, No. 1, pp. 39-44, Feb. 2016. (Year: 2016).*

(Continued)

*Primary Examiner* — Andrew M. Lyons
(74) *Attorney, Agent, or Firm* — Barnes & Thornburg LLP

(57) ABSTRACT

A method for updating software of a control unit of a vehicle which includes exchanging individual data blocks of the software in a memory of the control unit and generating cryptographic material for each exchanged data block by processing each exchanged data block with a cryptographic function. The method includes storing the generated cryptographic material in a test data block which contains cryptographic material for each data block and includes verifying the consistency of the cryptographic material, stored in the test data block, of all data blocks of the software (Continued)

by matching the cryptographic material stored in the test data block with consistency test data. The disclosed embodiments reduce the necessary cryptographic operations during a partial updating of the software of a control unit of a vehicle.

21 Claims, 1 Drawing Sheet

(51) Int. Cl.
| | |
|---|---|
| *G06F 9/445* | (2018.01) |
| *G06F 21/64* | (2013.01) |
| *H04L 9/06* | (2006.01) |
| *H04L 9/32* | (2006.01) |
| *G06F 21/57* | (2013.01) |

(52) U.S. Cl.
CPC .............. *G06F 21/57* (2013.01); *G06F 21/64* (2013.01); *H04L 9/0643* (2013.01); *H04L 9/3242* (2013.01); *H04L 9/3247* (2013.01); H04L 2209/84 (2013.01)

(58) Field of Classification Search
CPC ........ G06F 9/44536; G06F 21/61; G06F 8/62; G06F 8/63; G06F 8/64; G06F 8/654; G06F 8/656; H04L 9/0643; H04L 9/3242; H04L 9/3247; H04L 2209/84
USPC .................................................. 717/168–178
See application file for complete search history.

(56) References Cited

U.S. PATENT DOCUMENTS

| | | | | |
|---|---|---|---|---|
| 6,748,538 B1* | 6/2004 | Chan | ................. | G06F 21/56 |
| | | | | 348/E5.006 |
| 6,880,086 B2* | 4/2005 | Kidder | ................. | G06F 1/14 |
| | | | | 713/177 |
| 6,976,163 B1* | 12/2005 | Hind | ................. | G06F 21/572 |
| | | | | 713/1 |
| 7,069,452 B1* | 6/2006 | Hind | ................. | G06F 21/572 |
| | | | | 713/1 |
| 7,089,552 B2* | 8/2006 | Atallah | ................. | G06F 8/71 |
| | | | | 717/175 |
| 7,506,309 B2* | 3/2009 | Schaefer | ................. | G07C 5/008 |
| | | | | 701/31.4 |
| 7,520,811 B2* | 4/2009 | LeMay | ................. | G06F 21/57 |
| | | | | 463/29 |
| 7,752,455 B2* | 7/2010 | Maheshwari | ....... | G06F 21/6218 |
| | | | | 713/189 |
| 8,090,098 B2* | 1/2012 | Kim | ................. | H04L 9/0643 |
| | | | | 380/28 |
| 8,341,393 B2* | 12/2012 | Springfield | ............. | G06F 21/57 |
| | | | | 713/100 |
| 8,347,281 B2* | 1/2013 | Arsenault | ................. | G06F 8/65 |
| | | | | 717/168 |
| 8,484,427 B1* | 7/2013 | Goldobin | ................. | G06F 3/065 |
| | | | | 711/161 |
| 8,560,823 B1* | 10/2013 | Aytek | ................. | G06F 8/654 |
| | | | | 713/2 |
| 8,683,206 B2* | 3/2014 | Sarkar | ................. | G06F 21/64 |
| | | | | 701/32.6 |
| 8,978,160 B2* | 3/2015 | Alrabady | ................. | G06F 8/65 |
| | | | | 713/152 |
| 9,276,752 B2* | 3/2016 | Abraham | ................. | G06F 21/57 |
| 9,652,487 B1* | 5/2017 | Patiejunas | ......... | G06F 17/30371 |
| 9,720,782 B2* | 8/2017 | Gopalan | ............. | G06F 11/1458 |
| 9,996,697 B2* | 6/2018 | Mahaffey | ............ | H04L 63/0227 |
| 2002/0023223 A1* | 2/2002 | Schmidt | ................. | B60R 25/24 |
| | | | | 713/187 |
| 2002/0120856 A1* | 8/2002 | Schmidt | ............ | G05B 19/0426 |
| | | | | 713/193 |
| 2003/0055552 A1* | 3/2003 | Akins | ................. | B60W 50/04 |
| | | | | 701/114 |
| 2004/0260751 A1 | 12/2004 | Schloesser | | |
| 2005/0132357 A1* | 6/2005 | Shell | ................. | G06F 21/121 |
| | | | | 717/174 |
| 2006/0248172 A1* | 11/2006 | Zurawka | ................. | G06F 8/654 |
| | | | | 709/220 |
| 2008/0244553 A1* | 10/2008 | Cromer | ................. | G06F 21/572 |
| | | | | 717/168 |
| 2009/0064125 A1* | 3/2009 | Venkatachalam | ......... | G06F 8/65 |
| | | | | 717/170 |
| 2009/0113166 A1* | 4/2009 | Houston | ............. | G06F 11/1068 |
| | | | | 711/216 |
| 2009/0172416 A1* | 7/2009 | Bosch | ................. | H04L 9/0643 |
| | | | | 713/193 |
| 2010/0146231 A1* | 6/2010 | Gopalan | ............. | G06F 11/1469 |
| | | | | 711/162 |
| 2010/0318794 A1* | 12/2010 | Dierickx | ................. | B60R 25/04 |
| | | | | 713/164 |
| 2013/0047143 A1* | 2/2013 | Chalmers | ............. | G06F 21/572 |
| | | | | 717/168 |
| 2013/0111271 A1* | 5/2013 | Baltes | ................. | G06F 11/26 |
| | | | | 714/38.1 |
| 2013/0268754 A1* | 10/2013 | Baltes | ................. | H04L 9/3247 |
| | | | | 713/156 |
| 2014/0058532 A1* | 2/2014 | Das | ................. | G05B 19/0426 |
| | | | | 700/1 |
| 2014/0359296 A1* | 12/2014 | Alrabady | ............. | H04L 9/3247 |
| | | | | 713/176 |
| 2015/0154113 A1* | 6/2015 | Krieger | ................. | G06F 8/654 |
| | | | | 711/103 |
| 2015/0180840 A1* | 6/2015 | Jung | ................. | G06F 8/654 |
| | | | | 713/150 |
| 2015/0193224 A1* | 7/2015 | Ziat | ................. | G06F 8/65 |
| | | | | 717/172 |
| 2015/0288528 A1* | 10/2015 | Cho | ................. | H04L 9/3268 |
| | | | | 713/158 |
| 2015/0301821 A1* | 10/2015 | Danne | ................. | H04L 67/06 |
| | | | | 717/169 |
| 2015/0356319 A1* | 12/2015 | Kimberly | ................ | G06F 21/51 |
| | | | | 726/1 |
| 2015/0363187 A1* | 12/2015 | Dhar | ................. | G06F 8/654 |
| | | | | 713/2 |
| 2016/0070934 A1* | 3/2016 | Frank | ................. | G06F 21/572 |
| | | | | 711/103 |
| 2016/0135054 A1* | 5/2016 | Maise | ................. | H04W 12/06 |
| | | | | 713/176 |
| 2016/0203313 A1* | 7/2016 | El-Moussa | ................. | G06F 8/65 |
| | | | | 726/23 |
| 2016/0344705 A1* | 11/2016 | Stumpf | ............ | H04W 12/0023 |
| 2016/0373261 A1* | 12/2016 | Tschache | ................. | G06F 13/36 |
| 2017/0115981 A1* | 4/2017 | Oh | ................. | G06F 8/65 |
| 2017/0242680 A1* | 8/2017 | Angus | ................. | B60R 16/023 |
| 2017/0244704 A1* | 8/2017 | Brickell | ............. | H04L 63/0876 |
| 2017/0302441 A1* | 10/2017 | Temple | ................. | H04L 9/0643 |
| 2018/0159681 A1* | 6/2018 | Molter | ................. | H04L 9/0631 |
| 2018/0183605 A1* | 6/2018 | Kawabata | ................. | B60R 16/02 |

FOREIGN PATENT DOCUMENTS

| | | |
|---|---|---|
| DE | 102010033229 A1 | 2/2012 |
| DE | 102012215729 A1 | 3/2013 |
| DE | 102012109619 A1 | 5/2013 |
| DE | 102013108022 A1 | 3/2014 |
| DE | 102013202322 A1 | 8/2014 |

OTHER PUBLICATIONS

H. Mansor, K. Markantonakis, R. N. Akram and K. Mayes, "Don't Brick Your Car: Firmware Confidentiality and Rollback for Vehicles ," 2015 10th International Conference on Availability, Reliability and Security, Toulouse, 2015, pp. 139-148. (Year: 2015).*
D. K. Nilsson and U. E. Larson, "Secure Firmware Updates over the Air in Intelligent Vehicles," ICC Workshops—2008 IEEE Interna-

(56) References Cited

OTHER PUBLICATIONS tional Conference on Communications Workshops, Beijing, 2008, pp. 380-384. (Year: 2008).*
D. K. Nilsson, L. Sun and T. Nakajima, "A Framework for Self-Verification of Firmware Updates over the Air in Vehicle ECUs," 2008 IEEE Globecom Workshops, New Orleans, LA, 2008, pp. 1-5. (Year: 2008).*
Search Report for German Patent Application No. 10 2016 221 108.0, dated Jul. 10, 2017.

* cited by examiner

METHOD FOR UPDATING SOFTWARE OF A CONTROL DEVICE OF A VEHICLE

PRIORITY CLAIM

This patent application claims priority to German Patent Application No. 10 2016 221 108.0, filed 26 Oct. 2016, the disclosure of which is incorporated herein by reference in its entirety.

SUMMARY

Illustrative embodiments relate to a method for updating software of a control unit of a vehicle, a control unit, a vehicle and a communication system.

BRIEF DESCRIPTION OF THE DRAWINGS

The disclosed embodiments will be explained in the text which follows, by the associated drawings, in which.

DETAILED DESCRIPTION

Figure 1:
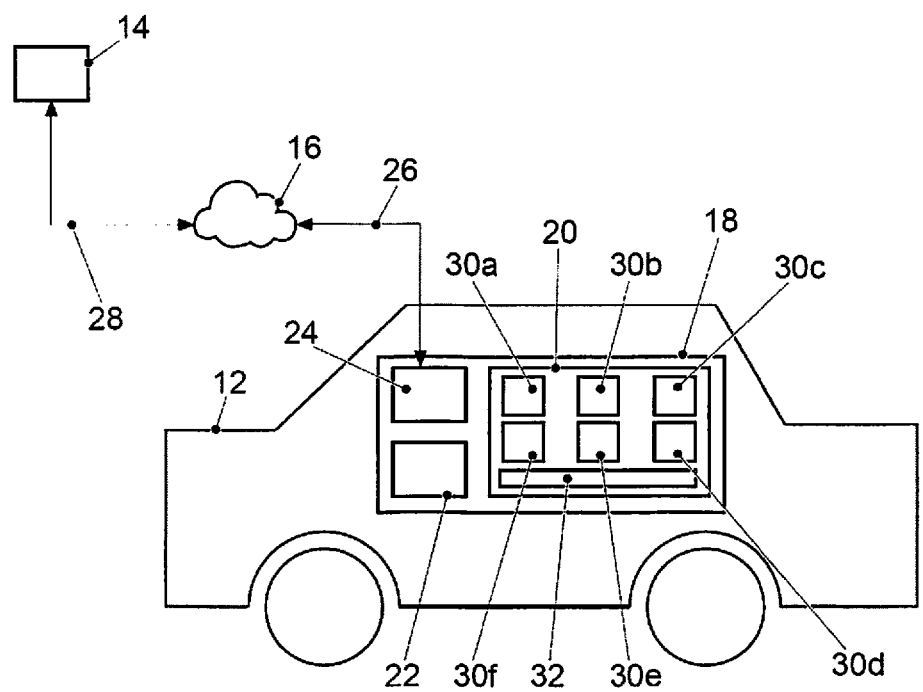
FIG. 1 shows an exemplary embodiment of the disclosed communication system in a diagrammatic representation.

The software of control units of modern vehicles can be updated to extend or improve the operability of the control unit, for example. In addition, the compatibility of control units with current hardware and/or other software can be extended by a software updating operation.

The updating of the software of a control unit can then be effected, for example, by the vehicle manufacturer or the vehicle user. In future, the software updating operations initiated by the vehicle user will increase considerably since vehicle users can subsequently obtain functions of the vehicle or of its control units, where the utilization of the newly acquired functions will partially require a corresponding software update.

In the updating of the software of a control unit, it has to be prevented that non-authentic, and thus possibly damaging software is recorded in the control unit.

With regard to a protected data exchange, printed document DE 10 2004 036 810 A1 proposes a communication method for two system components via a CAN bus system of a motor vehicle, wherein the system components in each case provide a predetermined fixed number of test codes known only to them. Based on a time-variable signal which is accessible to both system components, both system components select one of the test codes on starting the vehicle via an allocation function designed as a hash function and the useful data to be transmitted are coded by this.

Furthermore, a method for detecting a manipulation in the transmission of control data from a first control unit to a second control unit is known from printed document DE 10 2010 033 229 A1 wherein integrity-test information data for the control data transmitted by the first control unit are generated at the transmitter end by an integrity-test generation unit, a cryptographic test sum for integrity-test information data generated at the transmitter end is calculated by the integrity-test generation unit using a cryptographic key, and the integrity-test information data and the associated cryptographic test sum are transmitted to an integrity-test verification unit. The integrity-test verification unit verifies the cryptographic test sum by a cryptographic key.

In addition, a method for providing digital signatures for authenticating the source and the content of binary files which are flash-programmed into embedded control units of motor cars, is known from printed document DE 10 2012109 619 A1.

Printed document US 2009/0113166 A1 also proposes a method for updating blocks of a NAND flash memory.

In printed document DE 10 2012 215 729 A1, a method for authenticating a number of files is proposed.

In printed document US 2014/0058532 A2, a method for the partial overwriting of an engine control unit is proposed.

The printed document DE 60 2005 001 497 T2 also proposes a method for updating memory content in a data processing system.

These and other known approaches are either suitable only for updating a complete software and not for partial updating of software and/or require too high a computing power for performing the necessary cryptographic operations.

Disclosed embodiments reduce the necessary cryptographic operations during a partial updating of the software of a control unit of a vehicle.

The disclosed embodiments provide a method, a control unit, a vehicle, and by a communication system, respectively.

In the disclosed method for updating software of a control unit of a vehicle, individual data blocks of the software are exchanged in a memory of the control unit and cryptographic material is generated for each exchanged data block by processing each exchanged data block with a cryptographic function. According to the disclosed embodiments, the generated cryptographic material is stored in a test data block which contains for each data block respective cryptographic material, wherein the consistency of the cryptographic material, stored in the test data block, of all data blocks of the software is verified by matching the cryptographic material stored in the test data with consistency test data.

In the disclosed method, each data block of the software only has to be processed once by the cryptographic function. The verification of the consistency and thus also the testing of the authenticity of the software recorded in the control unit takes place by testing the cryptographic material generated by the cryptographic function and stored in the test data block. Each data block is additionally processed only when it is also altered. The cryptographic material of the data blocks not exchanged during the updating is already present in the test data block so that this cryptographic material does not have to be generated again before the consistency verification. In addition, the matching of the cryptographic material stored in the test data block with consistency test data only has to take place once during the consistency verification. The necessary cryptographic operations during a partial updating of the software of a control unit of a vehicle are thus considerably reduced, so that the computing outlay is considerably reduced during a secure update. It is to be understood that the test data block itself is not processed for generating cryptographic material with the cryptographic function so that the test data block also does not contain any cryptographic material by itself. This would create a recursion.

The method can comprise deleting the cryptographic material from the individual data blocks to be exchanged or exchange, from the test data block. Due to the fact that the cryptographic material of the individual data blocks to be exchanged or exchanged is deleted from the test data block and the newly generated cryptographic material of the individual data blocks exchanged is stored in the test data block, always only current cryptographic material is present in the test data block for all of the data blocks. In this way, the quantity of the cryptographic material to be stored and the quantity of the cryptographic material to be matched with the consistency test data during the consistency verification is restricted so that, on the one hand, memory space is saved and the verification of the consistency of the cryptographic material is simplified and accelerated.

The method can also comprise providing the data blocks to be exchanged and/or the consistency test data for the control unit by an external software updating entity. The external software updating entity may be a back end of a vehicle manufacturer or of a third-party provider. Providing the data blocks to be exchanged and/or the consistency test data can take place via a communication module of the control unit and/or via a communication module, connected signal-conductively to the control unit, of the vehicle. Providing the data blocks to be exchanged and/or the consistency test data for the control unit by the external software updating entity takes place via a cableless communication link, for example, by utilizing a WLAN network or a mobile radio communication network. The providing of the data blocks to be exchanged and/or of the consistency test data for the control unit may be effected by an external software updating entity via an Internet link.

The data blocks to be exchanged and the consistency test data can be provided to the control unit at the same time or with a time interval. If the data blocks to be exchanged and the consistency test data are provided to the control unit with a time interval, the control unit can be provided either with the data blocks to be exchanged or the consistency test data first. If the data blocks to be exchanged and the consistency test data are provided at the same time to the control unit, the control unit, after exchanging the individual data blocks, does not need a communication link to the external software updating entity so that the consistency verification can be performed by using the consistency test data after the exchange of the individual data blocks also when a data exchange with the external software updating entity is not possible. The updating process is thus simplified further.

The test data block can be stored in a secure memory of the control unit. Alternatively or additionally, the test data block can be stored in a secure memory outside the control unit, the control unit having access rights to the secure memory outside the control unit. Optionally, the data stored in the secure memory, and thus also the test data block, are secured against modification and reading out by unauthorized persons. In this way, the security level is increased again during execution of the software updating operation.

The cryptographic function used for generating the cryptographic material for each exchanged data block can be a hash function. Alternatively or additionally, the cryptographic material generated by the cryptographic function can comprise for each date block a hash value about the content of the respective data block. A hash function generates a hash value which unambiguously identifies a data block, the hash value being understandable as a fingerprint due to this identifying characteristic. This fingerprint has the characteristic that unauthorized persons cannot generate a corresponding data block on the basis of this fingerprint, which data block supplies the same fingerprint. Hash functions additionally require a comparatively low computing pair and are thus suitable as cryptographic function.

The cryptographic material generated by the cryptographic function can comprise for each data block a cryptographic key in addition to the hash value. Due to the fact that the cryptographic material generated by the cryptographic function comprises for each data block a cryptographic key additionally to the hash value, the security against recording non-authentic software on the control unit is increased again.

The cryptographic function used for generating the cryptographic material for each exchanged data block can be a signing function. Alternatively or additionally, the cryptographic material generated by the cryptographic function can comprise a digital signature of the respective data block for each data block. A signing function generates a signature which unambiguously identifies a data block, wherein the signature or a part of the signature can be understood to be a fingerprint due to this identifying characteristic. This fingerprint has the characteristic that unauthorized persons cannot generate a corresponding data block on the basis of this fingerprint which supplies the same fingerprint. Signing functions are thus also suitable as cryptographic function.

The cryptographic material generated by the cryptographic function can comprise for each data block a symmetric signature of the respective data block. If the cryptographic material generated by the cryptographic function comprises for each data block a symmetric signature of the respective data block, the verification of the consistency of the cryptographic material stored in the test data block of all data blocks of the software requires a low computing power so that the process of the software updating operation is further accelerated.

The cryptographic material generated by the cryptographic function can comprise for each data block a message authentication code of the respective data block. The message authentication code (MAC) is generated by an algorithm which generates from the respective data block and a secret key a test sum which is designated as message authentication code. A message authentication code unambiguously identifies a data block, wherein the message authentication code due to this identifying characteristic can also be understood to be a fingerprint which has the characteristics described above.

The consistency test data can comprise a cryptographic signature over the cryptographic material, to be expected in the test data block, of all data blocks of the software after the updating of the software. For verifying the consistency of the cryptographic material of all data blocks of the software stored in the test data block, the cryptographic material stored in the test data block is thus matched with a cryptographic signature over the cryptographic material, to be expected in the test data block of all data blocks of the software after updating of the software. If the cryptographic function used for generating the cryptographic material for each data block exchanged is a hash function, the hash values generated and stored in the test data block are matched with a cryptographic signature over the hash values, to be expected in the test data block, of all data blocks of the software after the updating of the software.

Generating the cryptographic material for each exchanged data block can be effected by the control unit and/or by the external software updating entity. The control unit may generate the cryptographic material to store it in the test data block. The external software updating entity generates the cryptographic material to be able to generate a cryptographic signature over the cryptographic material, to be expected in a test data block, of all data blocks of the software after the updating of the software.

The disclosed control unit of a vehicle is configured to carry out the method for updating software of a control unit of a vehicle in accordance with one of the embodiments described above. The same benefits and modifications apply as described above.

The disclosed vehicle comprises a control unit, the control unit being designed according to one of the embodiments described above. The same benefits and modifications apply as described above.

The disclosed communication system comprises a vehicle having a control unit, and an external software updating entity. The communication system is configured to carry out the method for updating software of a control unit of a vehicle according to one of the embodiments described above. The same benefits and modifications apply as described above.

Further disclosed embodiments are obtained from the remaining features mentioned in the subclaims. The various embodiments mentioned in the present application can be combined with one another unless embodied differently in the individual case.

FIG. 1 shows a communication system 10 comprising a vehicle 12 and an external software updating entity 14, the external software updating entity 14 being a back end of a vehicle manufacturer.

The vehicle 12 has a control unit 18. The control unit 18 comprises a memory 20, a computing unit 22 and a communication module 24. The communication module 24 is connected in signal-conducting manner to the external software updating entity 14 by the communication links 26, 28 via the Internet 16. The communication links 26, 28 allow for a bidirectional data exchange between the communication module 24 of the control unit 18 and the external software updating entity 14. The computing unit 22 is configured to carry out computing operations occurring within the control unit 18 which, in particular, also comprise cryptographic operations.

In the memory 20 of the control unit 18, a number of data blocks 30a-30f of software of the control unit 18 are stored. Furthermore, a test data block 32 which contains cryptographic material for each data block 30a-30f is stored in the memory 20 of the control unit 18.

The control unit 18 is configured to exchange individual data blocks 30a-30f of the software in the memory 20 of the control unit 18 and to generate cryptographic material for each exchanged data block 30a-30f by processing each exchanged data block 30a-30f having a cryptographic function.

In addition, the control unit 18 is configured to store the cryptographic material generated in the test data block 32 and to verify the consistency of the cryptographic material, stored in the test data block 32, of all data blocks 30a-30f of the software by matching the cryptographic material stored in the test data block 32 with consistency test data.

The external software actuating entity 14 is configured to provide the data blocks 30a-30f to be exchanged and the consistency test data to the control unit 18, wherein the data blocks 30a-30f to be exchanged and the consistency test data can be provided to the control unit 18 either at the same time or with a time interval by the external software updating entity 14.

For generating the cryptographic material for each exchanged data block 30a-30f, the control unit 18 and the external software updating entity 14 use a hash function, so that the cryptographic material generated comprises for each data block 30a-30f a hash value over the content of the respective data block 30a-30f. The consistency test data comprise a cryptographic signature over the hash values to be expected in the test data block 32 after the updating of the software, for all data blocks 30a-30f of the software.

Figure 2:
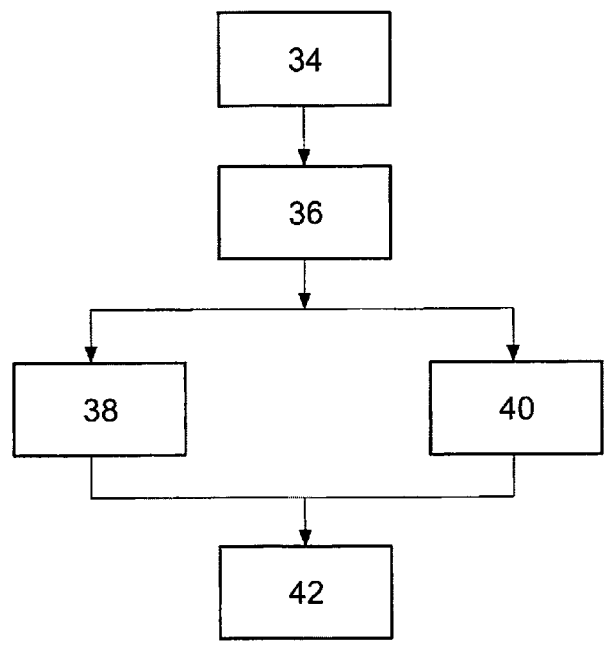
FIG. 2 shows an exemplary embodiment of the disclosed method for updating software of a control unit of a vehicle in a block diagram.

FIG. 2 shows a method for updating software of a control unit 18 of a vehicle 12 can be able to be carried out, for example, by the control unit from FIG. 1.

The method is initiated by the following operation:

34) exchanging individual data blocks 30a-30f of the software in a memory 20 of the control unit 18.

By exchanging individual and not all data blocks 30a-30f, a partial updating of the software of the control unit 18 is carried out. The data blocks 30a-30f can be, for example, flash blocks which are rewritten for recording a software update in the control unit 18. The data blocks 30a-30f to be exchanged are provided to the control unit 18 via an external software updating entity 14, the external software updating entity 14 being a back end of a vehicle manufacturer.

After the individual data blocks 30a-30f of the software have been exchanged in the memory 20 of the control unit 18, the following operation can be carried out:

36) generating a hash value for each exchanged data block 30a-30f by processing each exchanged data block 30a-30f with a hash function.

After a hash value has been generated for each exchanged data block 30a-30f, the following two operations can be carried out:

38) deleting the hash values of the individual exchanged data blocks 30a-30f from a test data block 32 which contains hash values for each data block 30a-30f; and 40) storing the newly generated hash values in the test data block 32.

The test data block 32 is stored in a secure memory of the control unit 18. By deleting the hash values of the individual exchanged data blocks 30a-30f from the test data block 32 and storing the newly generated hash values in the test data block 32, the hash values no longer current after the exchange of the individual data blocks 30a-30f of the software are replaced by the current hash values of the individual altered data blocks 30a-30f.

Since then current hash values are present in the test data block 32 for all data blocks 30a-30f of the software of the control unit 18, the following operation can be carried out:

42) verifying the consistency of the hash values, stored in the test data block 32, of all data blocks 30a-30f of the software by matching the hash values stored in the test data block 32 with a cryptographic signature over the hash values, to be expected in the test data block 32, for all data blocks 30a-30f of the software after the updating of the software.

The cryptographic signature over the hash values, to be expected in the test data block 32, of all data blocks 30a-30f of the software after the updating of the software is provided to the control unit 18 likewise by the external software updating entity 14.

Due to the fact that the generated cryptographic material is stored in a test data block which contains cryptographic material for each data block and the consistency of the cryptographic material, stored in the test data block, of all data blocks of the software is verified by matching the cryptographic material, stored in the test data block, with consistency test data, the necessary cryptographic operations are considerably reduced during a partial updating of the software of a control unit of a vehicle.

LIST OF REFERENCE DESIGNATIONS

10 Communication system
12 Vehicle
14 Software updating entity
16 Internet
18 Control unit
20 Memory
22 Computing unit
24 Communication module
26 Communication link
28 Communication link
30a-30f Data blocks
32 Test data block
34-42 Method operations

The invention claimed is:

1. A method for updating software of a control unit of a vehicle, the method comprising:
providing data blocks and consistency test data to the control unit at the same time;
exchanging a number of individual data blocks of the software in a memory of the control unit, wherein the number of exchanged data blocks is fewer than the total number of data blocks of the software to provide partial software update;
processing each one of the exchanged data blocks with a stored cryptographic function to generate respective cryptographic material for each exchanged data block;
storing the generated cryptographic material for each exchanged data block in a test data block including replacing previously stored cryptographic material for the exchanged data block, wherein the test data block includes cryptographic material for each individual data block; and
verifying consistency of the cryptographic material stored in the test data block for all data blocks of the software by matching the cryptographic material stored in the test data block with the consistency test data, wherein the consistency test data comprise a cryptographic signature about the cryptographic material to be expected in the test data block for each data block of the software after the storing of the generated cryptographic material for each exchanged data block.

2. The method of claim 1, further comprising deleting the cryptographic material from the exchanged individual data blocks or from the individual data blocks to be exchanged.

3. The method of claim 1, further comprising providing the data blocks to be exchanged and/or the consistency test data for the control unit by an external software updating entity, wherein the external software updating entity is a back end of a vehicle manufacturer or of a third-party provider.

4. The method of claim 1, wherein the test data block is stored in a secure memory of the control unit.

5. The method of claim 1, wherein the cryptographic function used for generating the cryptographic material for each exchanged data block is a hash function and/or the cryptographic material generated by the cryptographic function comprises, for each data block, a hash value about the content of the respective data block.

6. The method of claim 5, wherein the cryptographic material generated by the cryptographic function comprises, for each data block, a cryptographic key in addition to the hash value.

7. The method of claim 1, wherein the cryptographic function used for generating the cryptographic material for each exchanged data block is a signing function and/or the cryptographic material generated by the cryptographic function comprises a digital signature of the respective data block for each data block.

8. The method of claim 1, wherein the cryptographic material generated by the cryptographic function comprises, for each data block, a symmetric signature of the respective data block.

9. The method of claim 1, wherein the cryptographic material generated by the cryptographic function comprises, for each data block, a message authentication code of the respective data block.

10. The method of claim 1, wherein generating the cryptographic material for each exchanged data block is effected by the control unit and/or by the external software updating entity.

11. A control unit of a vehicle, wherein the control unit carries out a method for updating software of a control unit of a vehicle, the method comprising:
exchanging individual data blocks of the software in a memory of the control unit, wherein the number of exchanged data blocks is fewer than the total number of data blocks of the software to provide partial software update;
processing each of the exchanged data blocks with a stored cryptographic function to generate respective cryptographic material for each exchanged data block;
storing the generated cryptographic material for each exchanged data block in a test data block including replacing previously stored cryptographic material for the exchanged data blocks; and
verifying consistency of the cryptographic material stored in the test data block for all data blocks of the software by matching the cryptographic material stored in the test data block with consistency test data, wherein the consistency test data comprise a cryptographic signature about the cryptographic material to be expected in the test data block for each data block of the software after the updating of the software,
wherein the data blocks to be exchanged and the consistency test data are provided to the control unit at the same time.

12. The control unit of claim 11, wherein the method further comprises deleting the cryptographic material from the individual data blocks to be exchanged or exchanged, from the test data block.

13. The control unit of claim 11, wherein the method further comprises providing the data blocks to be exchanged and/or the consistency test data for the control unit by an external software updating entity, wherein the external software updating entity is a back end of a vehicle manufacturer or of a third-party provider.

14. The control unit of claim 11, wherein the test data block is stored in a secure memory of the control unit.

15. The control unit of claim 11, wherein the cryptographic function used for generating the cryptographic material for each exchanged data block is a hash function and/or the cryptographic material generated by the cryptographic function comprises, for each data block, a hash value about the content of the respective data block.

16. The control unit of claim 15, wherein the cryptographic material generated by the cryptographic function comprises, for each data block, a cryptographic key in addition to the hash value.

17. The control unit of claim 11, wherein the cryptographic function used for generating the cryptographic material for each exchanged data block is a signing function and/or the cryptographic material generated by the cryptographic function comprises a digital signature of the respective data block for each data block.

18. The control unit of claim 11, wherein the cryptographic material generated by the cryptographic function comprises, for each data block, a symmetric signature of the respective data block.

19. The control unit of claim 11, wherein the cryptographic material generated by the cryptographic function comprises, for each data block, a message authentication code of the respective data block.

20. The control unit of claim 11, wherein generating the cryptographic material for each exchanged data block is effected by the control unit and/or by the external software updating entity.

21. A vehicle, comprising:
 a control unit, wherein the control unit carries out a method for updating software of a control unit of a vehicle, the method comprising:
 exchanging individual data blocks of the software in a memory of the control unit, wherein the number of exchanged data blocks is fewer than the total number of data blocks of the software to provide partial software update;
 processing each of the exchanged data blocks with a cryptographic function to generate respective cryptographic material for each exchanged data block;
 storing the generated cryptographic material in a test data block including replacing previously stored cryptographic material for the exchanged data blocks; and
 verifying consistency of the cryptographic material stored in the test data block for all data blocks of the software by matching the cryptographic material stored in the test data block with consistency test data, wherein the consistency test data comprise a cryptographic signature about the cryptographic material to be expected in the test data block for each data block of the software after the updating of the software,
 wherein the data blocks to be exchanged and the consistency test data are provided to the control unit at the same time.

* * * * *